United States Patent [19]

Mozieka et al.

[11] Patent Number: 4,828,238

[45] **Date of Patent: * May 9, 1989**

[54] SUPPORTING BED FOR SHEET MATERIAL CUTTING MACHINE AND METHOD OF MANUFACTURE

[75] Inventors: Michael Mozieka, Wall Township, Belmar County; Leo Fisher, Fairlawn, both of N.J.

[73] Assignee: Crest-Foam Corporation, Moonachie, N.J.

[ * ] Notice: The portion of the term of this patent subsequent to Apr. 14, 2004 has been disclaimed.

[21] Appl. No.: 942,094

[22] Filed: Dec. 15, 1986

Related U.S. Application Data

[63] Continuation of Ser. No. 825,811, Feb. 4, 1986, Pat. No. 4,656,906.

[51] Int. Cl.[4] .......................... B26D 7/01; B32B 23/22; B32B 31/20; D06H 7/10

[52] U.S. Cl. .......................................... 269/21; 83/451; 83/658; 83/925 CC; 264/321; 521/52

[58] Field of Search .................. 83/451, 658, 925 CC; 264/321, 248, 241; 156/285, 497; 521/52; 269/21

[56] References Cited

U.S. PATENT DOCUMENTS

| | | | |
|---|---|---|---|
| 3,025,200 | 3/1962 | Powers | 521/52 X |
| 3,325,338 | 6/1962 | Geen | 521/52 X |
| 3,405,217 | 10/1968 | Garrett et al. | 521/52 X |
| 3,777,604 | 12/1973 | Gerber | 83/451 |
| 4,656,906 | 4/1987 | Mozieka et al. | 83/451 |

*Primary Examiner*—Frank T. Yost
*Assistant Examiner*—Hien H. Phan
*Attorney, Agent, or Firm*—Darby & Darby

[57] ABSTRACT

A supporting bed for supporting a stack of sheet material in a cutting machine of the type retaining the material by means of a vacuum applied from below the supporting bed is manufactured from a sheet of reticulated polyurethane foam material which has been compressed under heat and pressure so as to be permanently reduced to approximately 10-35% of its initial thickness. The degree of compression, the temperature and compression time, and the porosity of the reticulated polyurethane foam starting material are selected to provide particular airflow and firmness characteristics for the finished supporting bed. In a preferred embodiment of the invention, the starting material is a reticulated grafted polyether foam having a porosity of 30 pores per inch and a sheet thickness of 5 inches. The sheet of material is compressed to a thickness of one inch and retained under pressure for 10 minutes at a temperature of about 400° F.

19 Claims, 1 Drawing Sheet

SUPPORTING BED FOR SHEET MATERIAL CUTTING MACHINE AND METHOD OF MANUFACTURE

This is a continuation of application Ser. No. 825,811, filed Feb. 4, 1986 now U.S. Pat. No. 4,656,906.

FIELD OF THE INVENTION

The present invention relates generally to pattern cutting machines for sheet materials, and more particularly, concerns a bed for supporting and retaining the sheet material during the cutting operation and a method for manufacturing the same.

BACKGROUND OF THE INVENTION

Sheet material, such as fabric, is commonly cut into patterns on electronically guided machines comprising an elongated table over which a cutting tool is moved in a desired pattern by means of an precision positional control mechanism. Such tables are typically provided with a perforated top, below which a vacuum is applied for the purpose of drawing a multiple ply stack of the sheet material against the tabletop, thereby retaining it in position while it is being cut. Should the multiple layers of sheet material be retained effectively, a consistent relationship can be maintained between the cutting tool and the stack, enabling sheets with accurately cut patterns to be obtained reliably. On the other hand, should the sheets within the stack move from their intended position, a flawed pattern is cut into the sheets, resulting in excessive waste of material. The efficacy of the vacuum-operated sheet retention system therefore has a direct bearing on the economics of the entire cutting process.

To assure that the lower layers of the stack are cut properly, the cutting blade must be permitted to pass below the lowest layer. In order to avoid damage to the surface of the table, it is the common practice to provide a supporting bed between the tabletop and stack of material being cut. This supporting bed must have certain physical properties, in order to serve its purpose effectively. First of all, it must provide a firm, relatively unyielding support beneath the stack of material being cut, to avoid undesirable stack movement beneath the blade and resultant pattern errors in or damage to the cut sheet material. Secondly, the supporting bed must not impede the vacuum which is applied beneath the tabletop. It must therefore be capable of having a substantial volume of airflow through it. Third, it should have a relatively high coefficient of friction and should present the largest possible surface area to the bottom sheet of the stack, in order to avoid slipping of the stack relative to the tabletop. Finally, the supporting bed must have an upper surface which resists the gouging action of the cutting blade, in order to maintain the uniformity of its surface and to minimize the frequency of replacement of the supporting bed.

Various materials have been utilized for the supporting bed. Most commonly, it is made of a sheet of polyethylene foam which is approximately one inch thick. Polyethylene foam provides a rather firm support for the stack of sheet material. However, being a closed cell foam it is impervious to air. Accordingly, it is the common practice to punch or drill interspersed vertical holes through the polyethylene foam sheet, and a substantial number of such holes is required (per unit of sheet surface area), in order to provide the vacuum at the surface of the polyethylene sheet. Typically, for a one inch thick sheet, the holes would be about 5/16 of an inch in diameter and would be at a center-to-center spacing of about 1.5 inches. However, such a density of holes substantially reduces the firmness and surface area of the supporting bed, and the expense involved in forming the holes substantially increases the cost of the supporting bed.

In addition, such a perforated supporting bed holds the fabric effectively only at the holes. Between the holes, there may be wrinkling or bunching of the fabric, and the fabric above the holes may be stretched or frayed when the blade passes into the hole. Both of these effects result in cutting errors or damage to the fabric. The use of a perforated polyethylene foam supporting bed therefore represents, at best, a compromise, which results in a serious limitation upon the height to which the sheet material may be stacked and, even then, a certain amount of undesirable movement of the stack and damage to the sheet material will occur during cutting. As a result, some portion of the sheets cut by the machine will be unacceptable and must be discarded.

It has also been suggested that the supporting bed be made of upright bristles. Although such a construction provides a substantial airflow, it hardly provides an adequately firm supporting surface, particularly when a relatively heavy sheet material is being cut. Furthermore, this relatively weak support deteriorates rapidly, as the bristles are damaged by the cutting blade, after repeated use, and the supporting surface they provide becomes uneven.

Polyurethane foam has been suggested as a covering material for the surface of a supporting bed, because it exhibits the property of "healing" or recovering instantaneously from surface nicks inflicted by a sharp implement. Polyurethane foams may be either of the open or "tight" cell variety. In polyurethane foams, the individual cells are formed from a 3-dimensional skeletal structure comprising interconnected strands. Membranes or windows are attached to the strands and serve to divide or partition individual cells. In general the skeletal structure is substantially thicker than the windows or membranes. In so called "open cell" foams, a substantial number of the windows or membranes are broken or ruptured (even though they are still attached at their peripheral edges to the skeletal strands). Some small percentage of the windows may not be attached to the strands at the edges, or may be missing altogether, and this permits a limited air flow through the foam mass. Tight cell urethane foams have essentially all of the cellular windows or membranes intact (unbroken) and attached to skeletal structure of the foam. The use of polyurethane has been substantially limited, however, for essentially the same reasons as polyethylene.

"Reticulated" materials are also known to the art. Such materials have the cell membranes or windows partially or totally destroyed. These reticulated materials are prepared from the cellular materials of the prior art. Reticulated foam materials generally permit the passage of substantially greater volumes of air, in comparison to open or tight foam materials. Such reticulated foams generally have higher porosity than comparable "open" or "tight" cell foams Thus, in these reticulated materials, the primary support is supplied by the skeletal structure, since the cell membranes have been partially or totally eliminated. Examples of such reticulated materials extensively used by the prior art are the membrane destroyed or reticulated polyurethane foams which are employed in various filtering and detraining applications and as garment liners. Such reticulated foam materials and their process of manufacture are disclosed, for example, in U.S. Pat. Nos. 3,175,025 and 3,175,030 granted to Henry C. Geen on Mar. 23, 1965.

Reticulated materials of the flexible polyurethane type, have been in use for some time, owing to their porosity and softness as compared to non-reticulated flexible polyurethane cellular materials. However, attempts to use such materials in the supporting bed of a cutting machine have proven unsuccessful, because such materials offer virtually no support to the stack of sheet material while it is being cut and because the reticulated foam tends to collapse when the vacuum is applied.

Broadly, it is an object of the present invention to provide a supporting bed for supporting a stack of sheet material in a cutting machine of the type retaining the material by means of a vacuum applied from below the supporting bed, which supporting bed overcomes the disadvantageous and shortcomings of prior devices of this type.

It is specifically an object of the present invention to provide a supporting bed of the type described which is constructed so as to permit relatively free airflow therethrough, so as not to impede the holding action of the applied vacuum.

It is a further object of the present invention to provide a supporting bed of the type described which is constructed so as to provide a relatively firm, unyielding slip-free and continuous support for a stack of sheet material being cut on a pattern cutting machine.

It is yet another object of the present invention to provide a supporting bed of the type described which is substantially resistant to surface gouging inflicted by a sharp instrument.

It is yet another object of the present invention to provide a supporting bed of the type described which is reliable and convenient in use, yet relatively inexpensive and simple in construction, and requires a minimum of preparation and maintenance.

It is also an object of the present invention to provide a process for manufacturing a supporting bed of the type described.

In accordance with the present invention, a supporting bed is manufactured from a sheet of reticulated foam material which has been compressed under heat and pressure so as to be permanently reduced to approximately 10–35% of its initial thickness. The degree of compression, the temperature and compression time, and the porosity of the reticulated foam starting material are selected to provide particular airflow and firmness characteristics for the finished supporting bed. Preferably, a 1-inch thick sheet of the material should permit an airflow of at least 1.5 cfm through an area four inches square, with a pressure drop between the surfaces of the sheet material corresponding to ½ inch of water, and it should be sufficiently firm so that compressing a 1-inch thick sheet by one quarter of its thickness requires a pressure in excess of 1.5 psi. In accordance with a preferred embodiment of the invention, the starting material is a reticulated polyurethane foam of the- graft polyether type. The presently most preferred foam has a porosity of 30 pores per inch and a sheet thickness of 5 inches. The sheet of foam material is compressed to a thickness of one inch and retained under pressure for 10 minutes at a temperature of about 400° F.

BRIEF DESCRIPTION OF THE DRAWING

The foregoing brief description, as well as further objects, features and advantages of the present invention will be more completely understood from the following detailed description of presently preferred, but nonetheless illustrative, embodiments of the present invention, with reference being had to the accompanying drawing, in which.

DETAILED DESCRIPTION

Figure 1:
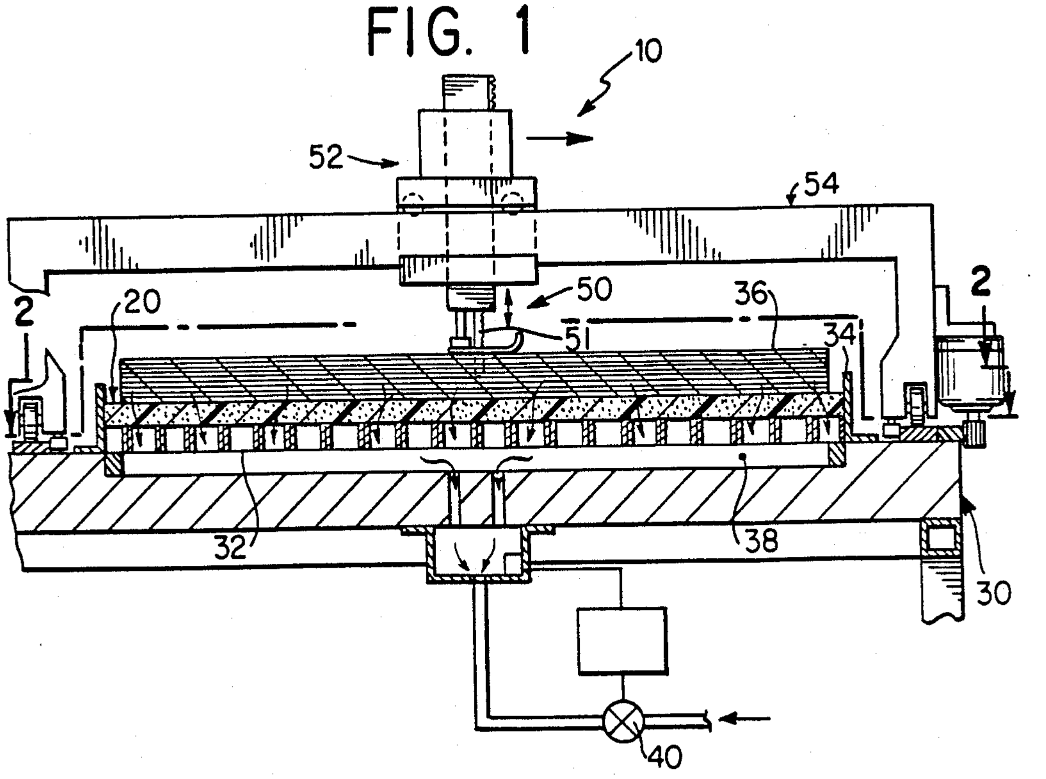
FIG. 1 is an elevational view taken from the front end of the cutting machine, with portions being shown in section, to illustrate certain details of the table top.
Figure 2:
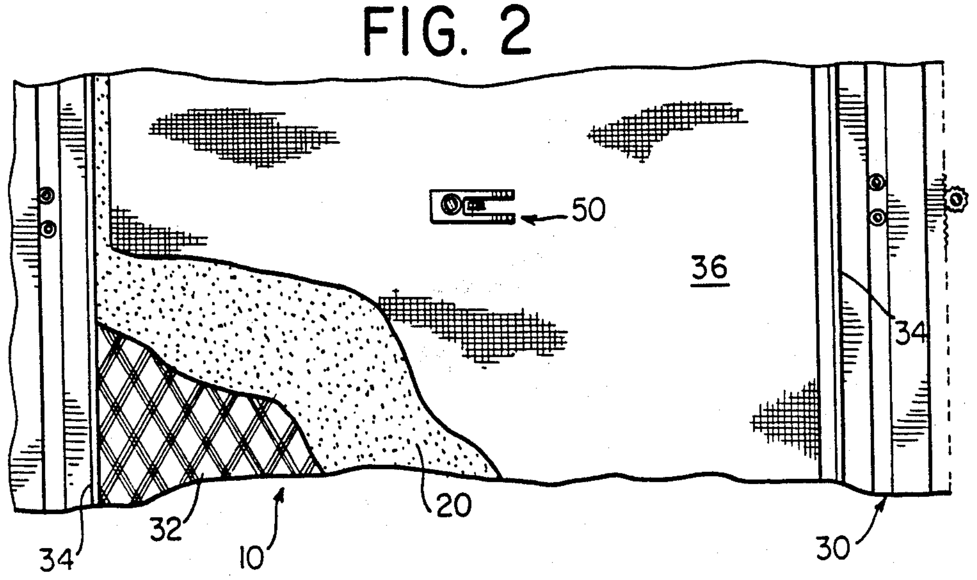
FIG. 2 is a sectional view taken along contour 2—2 in FIG. 1 and looking in the direction of the arrows.

Turning now to the details of the drawing, FIGS. 1 and 2 illustrate a cutting machine 10 for sheet material, which incorporates a supporting bed 20 in accordance with the present invention. The cutting machine includes a support table 30, which is provided with an air permeable top surface member 32 (shown diagrammatically as a grating). The supporting bed 20 rests upon the top 32 and is retained in position by means of an upright frame 34. A track 36 of sheet material to be cut is supported directly upon supporting bed 20. Below the table 30, there is provided a vacuum pump 40, which is appropriately coupled to a vacuum chamber 38 underneath the table top 32.

A cutting tool 50 is borne by a sub-carriage 52 which is, in turn, borne on a carriage assembly 54, which is mounted for precisely controlled movement along the length (i.e. perpendicular to the plane of FIG. 1) of the table 30. The subcarriage 52 is mounted for precisely controlled movement along the carriage 54 and therefore moves across the table 30 (i.e. to the left and right in FIG. 1). Appropriate motors and control mechanisms are provided to achieve the precisely controlled cutting action of cutting tool 50 through a pre-programmed cutting pattern.

In operation, air flow produced by pump 40, is drawn through supporting bed 20 and table top 32 into vacuum chamber 38 (illustrated by curved arrows in FIG. 1). As a result, ambient air pressure forces the stack of sheet material downwardly and retains it against the supporting bed 20. By design, the supporting bed 20 is firm, yet provides uniform air permeability over its entire area. As a result, not only is the sheet material held downwardly, but it is drawn into a very flat position, so as to avoid any wrinkling or bunching of the sheet material. Also, the firm support provided by supporting bed 20 assures that the fabric will not move downwardly as a result of the pressure provided by cutting blade 51, thereby assuring accurate cuts.

As can be seen in FIG. 1, the cutting blade 51 must extend below the bottom sheet of stack 36, in order to assure that the sheet is completely cut. Consequently, blade 51 will also cut into the top surface of supporting bed 20. As a result of its polyurethane foam composition, supporting bed 20 exhibits the property that the blade cuts "heal" or close up directly behind the blade. This avoids the need for frequent changes of the supporting bed and guarantees the continued durability and flatness of the bed.

Foamed or cellular polyurethane products are made, in a manner well-known in the art, by reacting an organic isocyanate, such as an aromatic di-isocyanate (e.g. toluene di-isocyanate), with a polyether polyol or a polyester resin, along with various other ingredients (e.g. catalysts, blowing agents, stabilizers and the like). A gas or vapor is usually generated (along with heat) in situ while the reaction mixture remains in the plastic or fluid state. The generation of this gas results in the formation of bubbles, approximately spherical in form, in the plastic material. As these bubbles expand, cells are formed and the resulting structure of the cooled foam material is comprised of a skeletal structure and cell membranes.

In accordance with the present invention, supporting bed 20 is manufactured from a sheet of reticulated foam material which has been compressed under heat and pressure in a conventional heated press so as to be permanently reduced to approximately 10–35% of its initial thickness. The degree of compression, the temperature and compression time, and the porosity of the reticulated foam starting material are selected to provide particular airflow and firmness characteristics for the finished supporting bed. Preferably, a 1-inch thick sheet of the support bed should permit an airflow of at least 1.5 cfm through an area 4 inches square, with a pressure drop between the surfaces of the sheet material corresponding to ½ inch of water, and it should be sufficiently firm so that compressing a 1-inch thick sheet by one quarter of its thickness requires a pressure in excess of 1.5 psi. With reticulated polyurethane foams, this is typically achieved by compressing the foam at 300°–450° F. for a time period between 8 minutes and 2 hours.

The reticulated polyurethane foams which were used as the starting material in the examples below are all commercially available under the trademark Filtercrest from Crest-available Foam Corp. of Moonachie, N.J. These foams were reticulated by the process described in U.S. Pat. No. 3,175,025. This process involves providing a combustible mixture of an oxidizer material and an oxidizable material within and about a block of the foam material and igniting the mixture, so that the shock waves produced by the ignition destroy substantially all the windows within the block of material. However, this is merely illustrative of one type of starting material that may be used for the invention. Those skilled in the art will appreciate that materials reticulated by any other process will work equally well in the invention.

EXAMPLE 1

The starting material is selected as an 5 inch thickness of a reticulated grafted, polyether polyurethane foam sold under the trademark Filtercrest T-30 by the Crest-Foam Corp. of Moonachie, N.J. This material has a density of about 1.4 pounds per cubic foot, a porosity of about 30 pores per inch, and an airflow of about 18.5 cfm through an area four inches square, with a pressure difference corresponding to half an inch of water between its surfaces. The sheet was compressed to a thickness of 1 inch and maintained at a temperature of about 400° F. for about 10 minutes. The resulting sheet material retained a thickness of 1 inch when the pressure was removed, but exhibited substantially improved firmness, while permitting substantial airflow: compressing the new sheet material by ¼ of an inch required 4.67 psi and there was an airflow of 3.1 cfm through an area of four square inches with a pressure difference across the surfaces of the sheet equivalent to ½ inch of water.

EXAMPLE 2

Beginning with the same starting material as example 1, the material was pre-heated in a forced air oven at about 350°–400° F. for about 15 minutes. An end product exhibiting the same firmness and air flow characteristics as the product of Example 1 was obtained by compressing the foam for only half the time specified in example 1.

EXAMPLE 3

The starting material was selected as an 7 inch thickness of a reticulated grafted, polyether polyurethane foam sold under the trademark Filtercrest T-15 by the Crest-Foam Corp. of Moonachie, N.J. This material has a density of about 1.4 pounds per cubic foot, a porosity of 15 pores per inch, and an airflow of about 22 cfm through a four square inch area, with a pressure difference corresponding to half an inch of water between its surfaces. The sheet was compressed to a thickness of 1 inch and maintained at a temperature of about 400° F. for about 10 minutes. The resulting sheet material retained a thickness of 1 inch when the pressure was removed, but exhibited substantially improved firmness, while permitting substantial airflow: compressing the new sheet material by ¼ of an inch required 6.63 psi and an airflow of 2.67 cfm through a four square inch area was obtained with a pressure difference across the surfaces of the sheet equivalent to ½ inch of water.

EXAMPLE 4

The starting material was selected as an 6 inch thickness of a reticulated polyester polyurethane foam sold under the trademark Filtercrest S-10 by the Crest-Foam Corp. of Moonachie, N.J. This material has a density of about 2.0 pounds per cubic foot, a porosity of 10 pores per inch, and an airflow of about 21 cfm through a four square inch area, with a pressure difference corresponding to half an inch of water between its surfaces. The sheet was compressed to a thickness of 1 inch and maintained at a temperature of about 400° F. for about 10 minutes. The resulting sheet material retained a thiokness of 1 inch when the pressure was removed, but exhibited substantially improved firmness, while permitting substantial airflow: compressing the new sheet material by ¼ of an inch required 7.43 psi and an airflow of 3.00 c.f.m. resulted through a four square inch area, with a pressure difference corresponding to half an inch of water between its surfaces faces.

EXAMPLE 5

The starting material was selected as an 7 inch thickness of a reticulated polyester polyurethane foam sold under the trademark Filtercrest S-10 by the Crest-Foam Corp. of Moonachie, N.J. This material has a density of about 2.0 pounds per cubic foot and a porosity of 10 pores per inch, and an airflow of about 21 cfm through a four square inch area, with a pressure difference corresponding to half an inch of water between its surfaces. The sheet was compressed to a thickness of 1 inch and maintained at a temperature of about 400° F. for about 10 minutes. The resulting sheet material retained a thickness of 1 inch when the pressure was removed, but exhibited substantially improved firmness, while permitting substantial airflow: compressing the new sheet material by ¼ of an inch required 12.44 psi and an airflow of 2.10 c.f.m. through a four square inch area, with a pressure difference corresponding to half an inch of water between its surfaces.

Although preferred embodiments of the invention have been disclosed for illustrative purposes, those skilled in the art will appreciate that many additions, modifications and substitutions are possible, without departing from the scope and spirit of the invention as defined in the accompanying claims.

What is claimed is:

1. A method for using a sheet of reticulated foam starting material which has been compressed under heat and pressure so as to be permanently reduced to a thickness no greater than approximately 35% of its initial thickness as a supporting bed for supporting a stack of sheet material in a cutting machine of the type retaining the material by means of a vacuum applied from below the supporting bed, said method comprising the steps of placing said sheet of reticulated foam material on said cutting machine as a supporting bed, placing said stack of sheet material thereon and coupling a source of a vacuum to a point underneath said supporting bed and said stack.

2. A supporting bed for supporting a stack of sheet material in a cutting machine of the type retaining the material by means of a vacuum applied from below the supporting bed, said supporting bed comprising a sheet of reticulated foam starting material which has been compressed under heat and pressure so as to be permanently reduced to a thickness no greater than approximately 35% of its initial thickness, the degree of compression, the temperature, the compression time and the porosity of the reticulated foam starting material being selected so that sufficient air flow is obtained through said supporting bed to retain said stack of sheet material in position by means of said vacuum during a cutting operation, and so as to impart sufficient firmness to said supporting bed to avoid substantial vertical compression thereof during said cutting operation.

3. A supporting bed in accordance with claim 2, wherein the starting material is a reticulated polyurethane foam and is compressed for a period of time between 8 minutes and 2 hours at a temperature between 300° F. and 450° F.

4. A supporting bed in accordance with claim 2 wherein the starting material is a reticulated grafted polyether polyurethane foam.

5. A supporting bed in accordance with claim 4 wherein the starting material is a sheet approximately five inches thick with a density of about 1.4 pounds per cubic food and a porosity of about 30 pores per inch, the sheet being compressed to a thickness of approximately one inch and maintained at a temperature of about 400° F. for about 10 minutes.

6. A supporting bed in accordance with claim 4 wherein the starting material is a sheet approximately seven inches thick with a density of about 1.4 pounds per cubic foot and a porosity of about 15 pores per inch, the sheet being compressed to a thickness of approximately one inch and maintained at a temperature of about 400° F. for about 10 minutes.

7. A supporting bed in accordance with claim 2 wherein the starting material is a reticulated polyester polyurethane foam.

8. A supporting bed in accordance with claim 7 is a sheet approximately six inches thick with a density of about 2.0 pounds per cubic foot and a porosity of about 10 pores per inch, the sheet being compressed to a thickness of approximately one inch and maintained at a temperature of about 400° F. for about 10 minutes.

9. A supporting bed in accordance with claim 7 is a sheet approximately seven inches thick with a density of about 2.0 pounds per cubic foot and a porosity of about 10 pores per inch, the sheet being compressed to a thickness of approximately one inch and maintained at a temperature of about 400° F. for about 10 minutes.

10. A supporting bed in accordance with claim 2, wherein the degree of compression, the temperature, the compression time, and the porosity of the reticulated foam starting material are selected so that a one-inch thick sheet of the supporting bed permits an air flow at least 1.5 CFM through a four square inch area with a pressure drop between the surfaces of the sheet material corresponding to one half inch of water, and so that compressing a 1-inch thick sheet by one-quarter of an inch requires a pressure of at least 1.5 PSl.

11. A method for manufacturing a supporting bed for supporting a stack of sheet material in a cutting machine of the type retaining the stack of material by means of a vacuum applied from below the supporting bed, said method comprising the steps of: compressing a sheet of reticulated foam starting material, and simultaneously applying heat thereto so as to permanently reduce said sheet to a thickness no greater than approximately 35% of its initial thickness, the degree of compression, the temperature, the compression time and the porosity of the reticulated foam starting material being selected so that the efficient air flow is obtained through said supporting bed to retain said stack of sheet material in position by means of said vacuum during a cutting operation, and so as to impart sufficient firmness to said supporting bed to avoid substantial vertical compression thereof during said cutting operation.

12. The method of claim 11, wherein the starting material is a sheet of reticulated polyurethane foam and is compressed for a period of time between 8 minutes and 2 hours at a temperature between 300° F. and 450° F.

13. The method of claim 11 wherein the starting material is a sheet of reticulated grafted polyether polyurethane foam.

14. The method of claim 13 wherein the starting material is a sheet approximately five inches thick with a density of about 1.4 pounds per cubic foot and a porosity of about 30 pores per inch, said method comprising compressing said sheet to a thickness of approximately one inch and maintaining it at a temperature of about 400° F. for about 10 minutes.

15. The method of claim 13 wherein the starting material is a sheet approximately seven inches thick with a density of about 1.4 pounds per cubic foot and a porosity of about 15 pores per inch, said method comprising compressing said sheet to a thickness of approximately one inch and maintaining it at a temperature of about 400° F. for about 10 minutes.

16. The method of claim 11 wherein the starting material is a sheet of reticulated polyester polyurethane foam.

17. The method of claim 16 wherein said sheet is approximately six inches thick with a density of about 2.0 pounds per cubic foot and a porosity of about 10 pores per inch, said method comprising compressing the sheet to a thickness of approximately one inch and maintaining it at a temperature of about 400° F. for about 10 minutes.

18. The method of claim 16 wherein said sheet is approximately seven inches thick with a density of about 2.0 pounds per cubic foot and a porosity of about 10 pores per inch, said method comprising compressing said sheet to a thickness of approximately one inch and maintaining it at a temperature of about 400° F. for about 10 minutes.

19. A method in accordance with claim 11 wherein the degree of compression, the temperature, the compression time, and the porosity of the reticulated foam starting material are selected so that a one-inch thick sheet of the supporting bed permits an air flow at least 1.5 CFM through a four square inch area with a pressure drop between the surfaces of the sheet material corresponding to one half inch of water, and so that compressing a 1-inch thick sheet by one quarter of an inch requires a pressure of at least 1.5 PSI.

* * * * *